(12) United States Patent
Martin

(10) Patent No.: US 6,312,018 B1
(45) Date of Patent: Nov. 6, 2001

(54) APPARATUS AND METHOD FOR CONNECTING TUBULAR MEMBERS

(76) Inventor: Charles F. Martin, P.O. Box 354, Porter, TX (US) 77365

( * ) Notice: Subject to any disclaimer, the term of this patent is extended or adjusted under 35 U.S.C. 154(b) by 0 days.

(21) Appl. No.: 09/347,649

(22) Filed: Jul. 6, 1999

(51) Int. Cl.[7] .............................. F16L 35/00; F16L 55/00
(52) U.S. Cl. .......................... 285/39; 285/93; 285/382.4; 29/523
(58) Field of Search .......................... 29/237, 282, 283.5, 29/522.1, 523; 285/39, 93, 382.4, 398

(56) References Cited

U.S. PATENT DOCUMENTS

| | | | |
|---|---|---|---|
| 4,220,034 | * | 9/1980 | Pogonowski ........................ 29/523 X |
| 4,411,456 | | 10/1983 | Martin . |
| 4,676,531 | | 6/1987 | Martin . |
| 4,768,275 | * | 9/1988 | Schmitz .............................. 29/523 X |
| 4,805,430 | * | 2/1989 | Schmitz et al. ..................... 29/523 X |
| 4,944,173 | * | 7/1990 | Swars .................................. 29/523 X |
| 5,341,559 | * | 8/1994 | Reid et al. .............................. 29/523 |
| 5,713,611 | * | 2/1998 | Kurimoto et al. .................. 29/523 X |
| 5,868,524 | | 3/1999 | Martin . |

* cited by examiner

*Primary Examiner*—Neill Wilson
(74) *Attorney, Agent, or Firm*—Browning & Bushman P.C.

(57) ABSTRACT

In an apparatus for connecting tubular members together by cold forging a plurality of rollers are carried on a shaft which includes a tapered portion cooperating with the rollers to force the rollers radially outwardly to forge the tubular member into the end portion of a surrounding tubular member. The forging apparatus is provided with a gear mechanism which incrementally rotates the rollers upon completion of each reciprocal pass so that substantially all of the internal surface of the tubular member is contacted by the rollers to forge the tubular member into the end portion of the surrounding tubular member.

11 Claims, 8 Drawing Sheets

APPARATUS AND METHOD FOR CONNECTING TUBULAR MEMBERS

BACKGROUND OF THE INVENTION

This invention relates generally to the field of connecting tubular members together to form a confined passage, such as a pipeline. More specifically, this invention relates to an apparatus and method for securing connectors or collars on the ends of tubulars for connection of the tubulars end to end to form a conduit, such as a pipeline, particularly in underwater conditions.

In offshore oil recovery operations, the wellhead is typically on the seabed and oil is distributed to a production platform or collection facility through a submerged pipeline. Joining together submerged pipeline members or repairing submerged pipelines is difficult to do employing conventional welding techniques or other customary procedures. This problem is addressed by a variety of mechanical connectors which are available to secure the ends of pipeline sections together below the water surface without welding. These devices typically secure the ends of pipe together by connectors which mechanically grip the pipe ends. Effecting a complete seal about the pipe ends utilizing such connectors is difficult and time consuming, often requiring divers to perform relatively complicated and time consuming procedures under water to join the pipe ends together.

Another problem associated with conventional mechanical connectors is that some such connectors require internal pipe gripping devices. Such internal devices are undesirable because frequently they interfere with devices run through the pipeline which require an unrestricted internal pipeline passage. For many applications, internal restrictions in the pipeline are unacceptable.

Generally, conventional underwater pipe connectors have been difficult and expensive to use, and the pipeline segments made with such conventional connectors are in many instances prone to failure.

It is therefore an object of the present invention to provide an apparatus and method for effecting underwater connection of pipe ends by cold forging a connection collar or flange fitting on the end of a pipe.

It is another object of the present invention to provide an apparatus for forging the end of a pipe into a collar or other pipe fitting which may be remotely operated.

It is yet another object of the present invention to provide a pipeline connector which does not restrict the internal pipe passage.

It is still another object of the present invention to provide an apparatus for cold forging a pipe fitting on a pipe end by reciprocating a plurality of rollers driven by hydraulic pressure along the internal surface of the pipe to force the pipe end laterally outwardly for sealing engagement with the pipe fitting.

SUMMARY OF THE INVENTION

In a preferred embodiment of the invention, pipe joints are connected together by cold forging the ends of the pipe joints laterally outwardly into a surrounding collar or flange fitting for connecting pipe joints together to form a pipeline. The forging apparatus of the invention is hydraulically operated to reciprocate a plurality of rollers along the inside of the pipe joint for expanding the end thereof into a surrounding collar or flange fitting. The rollers are carried on a shaft which includes a tapered portion cooperating with the rollers to force the rollers radially outwardly to forge the pipe end into the flange collar. The forging apparatus is provided with a gear mechanism which incrementally rotates the rollers upon completion of each reciprocal pass so that substantially all of the internal surface of the pipe end is contacted by the rollers to forge the pipe end into the surrounding flange collar.

The foregoing features, advantages and objects of the invention, as well as other features apparent to those skilled in the art, will be more fully described and understood by reference to the following drawings, specification and claims.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION OF A PREFERRED EMBODIMENT

Figure 1A:
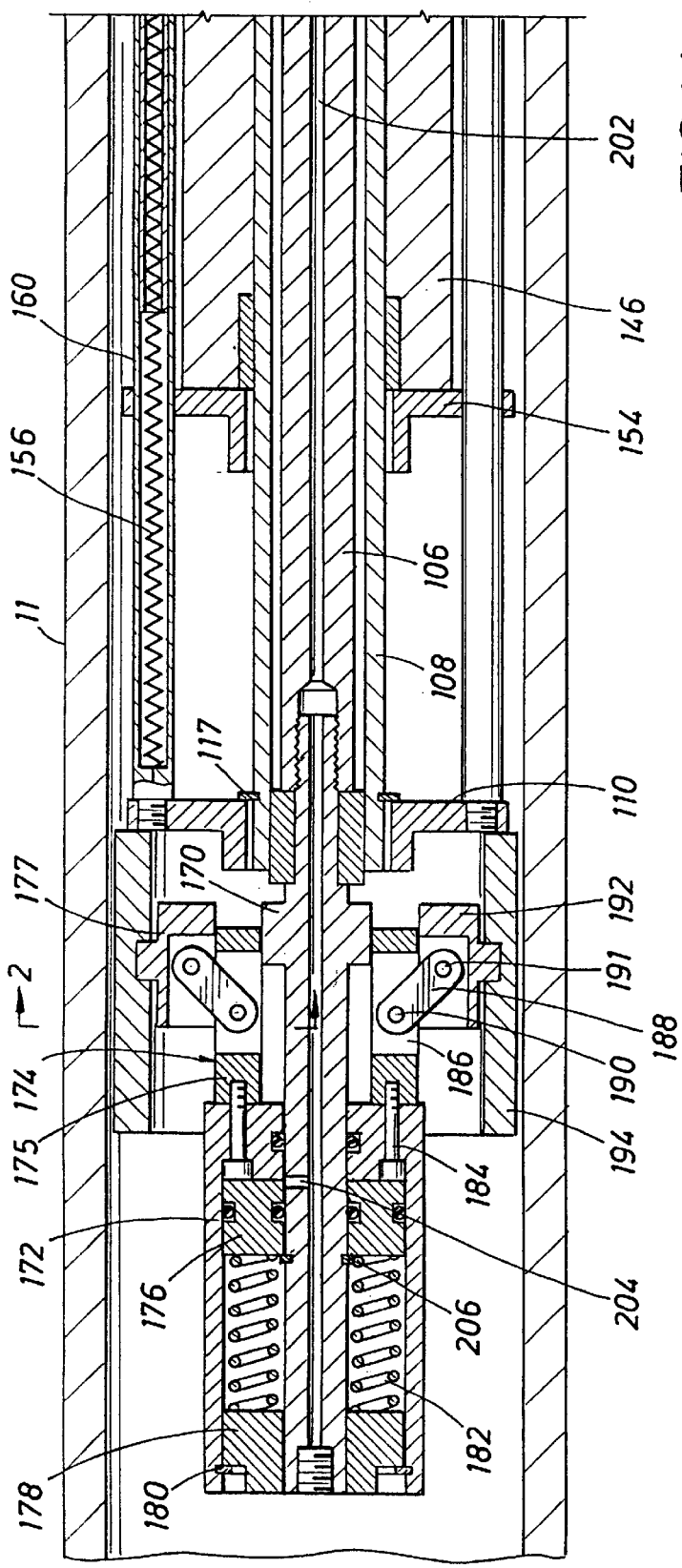
FIGS. 1A–1C are section views of the forging apparatus of the invention illustrating the location of the forging tool in a pipe prior to forging the end of the pipe into the collar of a pipe connector.
Figure 1B:
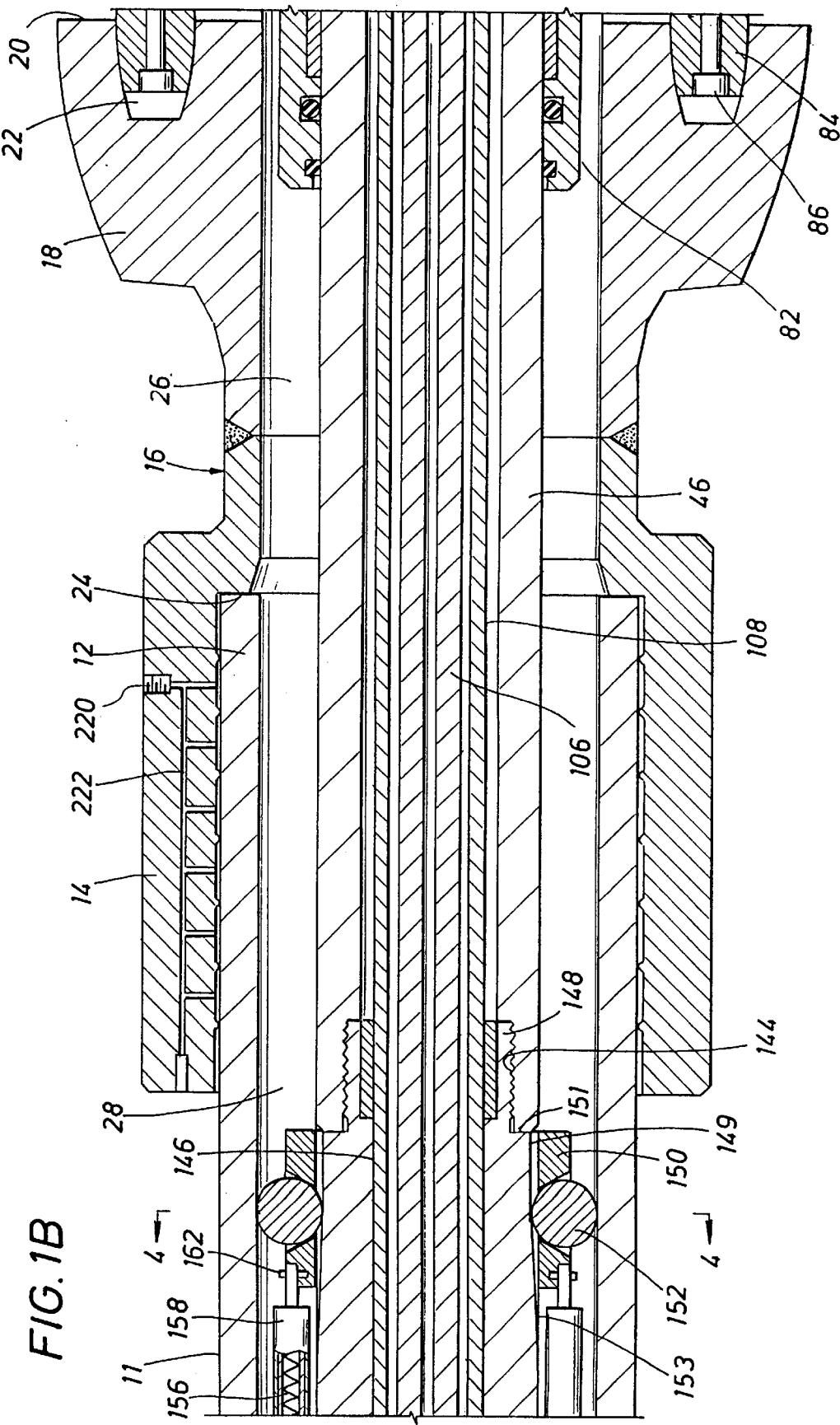
Figure 1C:
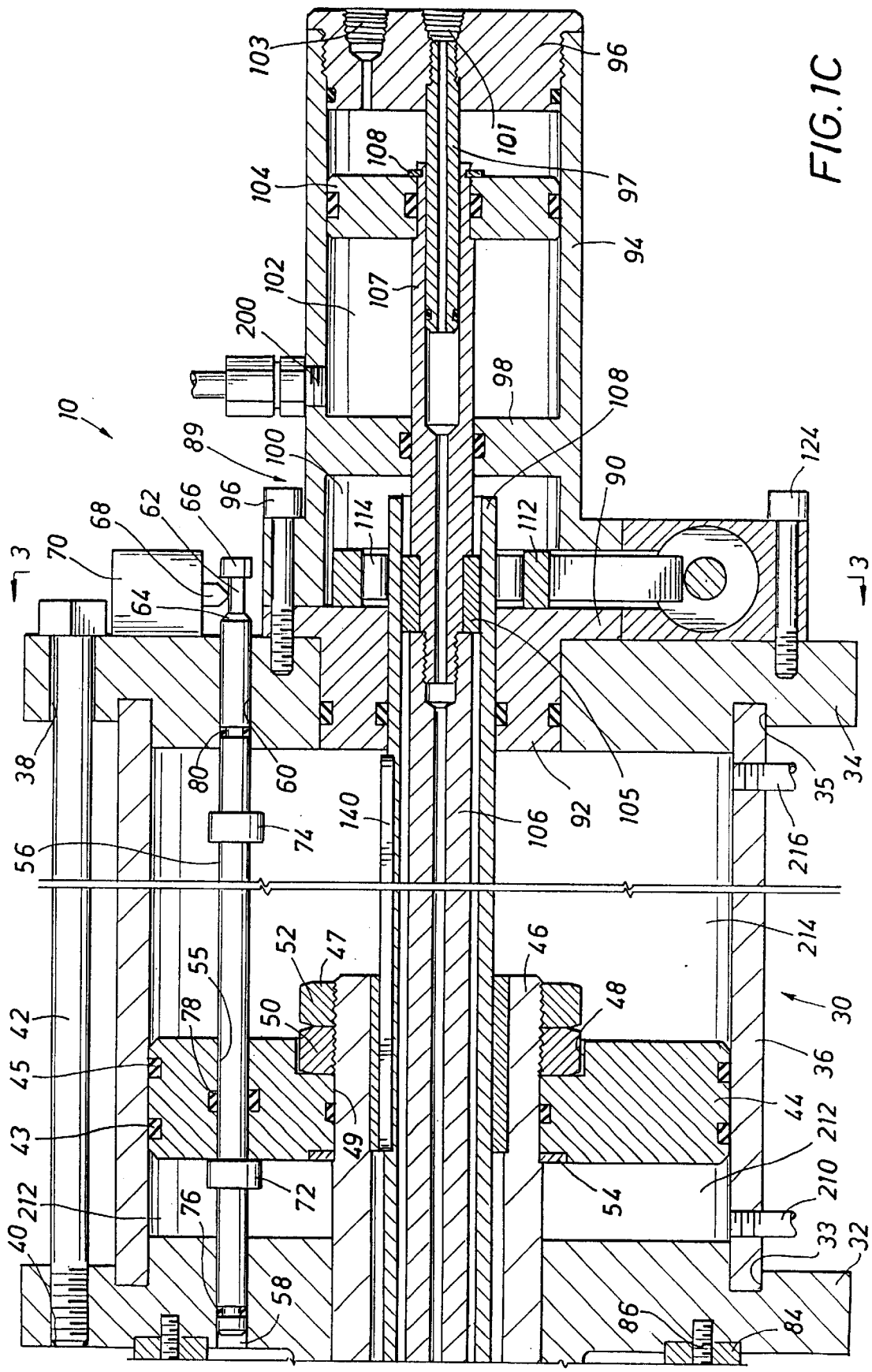

Referring first to FIGS. 1A–1C, collectively, the forging apparatus of the invention generally identified by the reference numeral 10 is depicted located within an end 12 of a pipe section or conduit 11 prior to forging the pipe end 12 into a surrounding collar 14 of a pipe connector 16. The collar 14 is dispose over the end 12 of the pipe 11, as best shown in FIG. 1B. A flange plate 18 is connected to the opposite end of the collar 14. The flange plate 18 includes a planar end face 20 and a circumferential groove 22 formed in the end face 20.

Figure 6:
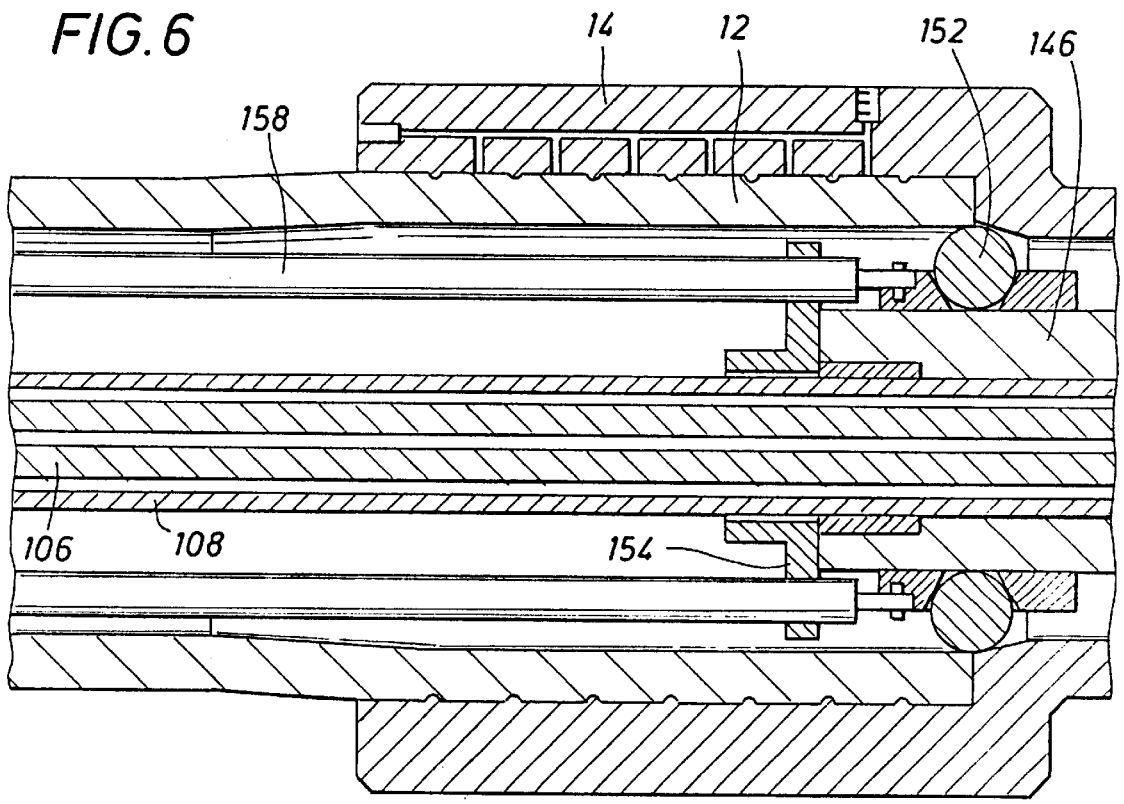
FIG. 6 is a partial section view depicting the forged pipe end and the forging apparatus of the invention upon completion of the forging sequence.

Referring still to FIG. 1B, the end 12 of the pipe 11 is inserted into the collar 14 so that the end 12 abuts against an internal circumferential shoulder 24 formed in the collar 14. When the pipe end 12 is inserted into the collar 14 in the manner shown in FIG. 1B, an overlapping joint area is formed between the pipe end 12 and the collar 14. It will be observed that in the overlapping joint area, the inner wall of the pipe end 12 partially extends into the axial passage 26 of the pipe connector 16. After forging the pipe end 12 into the collar 14, a substantially smooth transition is provided between the passage 26 of the pipe connector 16 and the passage 28 of the pipe 11, as shown in FIG. 6.

The forging apparatus 10 of the present invention is employed for exerting a laterally outwardly directed forging force on the internal surface of a surrounding body. In FIGS. 1A–1C of the drawings, the surrounding body is the end 12 of the pipe 11 which is being forged into the surrounding collar 14 of the pipe connector 16.

Referring now to FIG. 1C, the forging apparatus 10 includes a piston housing 30 which is formed by a pair of spaced and oppositely facing plates 32 and 34 separated by a cylindrical sleeve 36. Grooves 33 and 35 are formed in the plates 32 and 34 for receiving the ends of the sleeve 36. The plates 32 and 34 extend radially outward beyond the periphery of the sleeve 36. The plate 34 is provided with a plurality of circumferentially disposed, longitudinally extending bores 38. A plurality of circumferentially disposed, longitudinally extending threaded bores 40 in spaced axial alignment with the bores 38 are provided in the plate 32. Bolts 42 extend through the bores 38 and are received in the threaded bores 40 for securing the sleeve 36 between the opposed plates 32 and 34.

A piston 44 is received within the sleeve 36 as shown in FIG. 1C. The piston 44 is mounted on a tube 46 having a threaded end 47 extending through a central bore 49 in the piston 44. A circumferential recess 48 formed in the piston 44 circumscribes the central bore 49 of the piston 44 and a spacer 50 received in the recess 48 is journalled about the threaded end 47 of the tube 46. A nut 52 threaded on the threaded end 47 of the tube 46 and a snap ring 54 cooperate to fix the piston 44 on the tube 46. O-ring seals 43 and 45 form a sealing and sliding engagement between the periphery of the piston 44 and the sleeve 36.

A second bore 55 extending through the piston 44 is offset from the central bore 49. A rod 56 extends through the bore 55 in the piston 44. The rod 56 includes opposite ends received in spaced and axially aligned bores 58 and 60 formed in the plates 32 and 34, respectively. The end of the rod 56 extending through the plate 34 includes a reduced diameter portion 62 defining a gap between a tapered shoulder 64 and a head portion 66. The distal end of a toggle switch 68 connected to a solenoid valve 70 mounted on the plate 34 projects into the gap between the shoulder 64 and head 66 of the rod 56. The rod 56 further includes collars 72 and 74 which may be integrally formed with the rod 56. The piston 44 is located between the collars 72 and 74. O-ring seals 76, 78 and 80 form a sealing and sliding engagement between the components which are engaged by these seals while simultaneously permitting relative longitudinal displacement between the components.

Referring now to FIGS. 1B and 1C, it will be observed that the plate 32 is provided with a centrally located hub 82 projecting longitudinally outwardly from the plate 32 and defining an axial passage extending through the plate 32. A gasket 84 is received in a circumferential groove formed in the plate 32 and secured thereon by bolts 86.

The forging apparatus 10 includes a gear housing 89 mounted on the plate 34 as shown in FIG. 1C. The gear housing 89 includes a base 90 provided with an upstanding portion 92 sized to be received in a bore formed in the plate 34. A cylinder 94 extends outward from the base 90. The lower end of the cylinder 94 includes a flange 95 extending radially outward and in facing contact with the base 90. A transverse wall 98 divides the cylinder 94 into two chambers 100 and 102. A cap 96 threaded on the upper end of the cylinder 94 is provided with fluid ports 101 and 103. The gear housing base 90 and cylinder 94 are mounted to the plate 34 by bolts 96.

The chamber 102 of the cylinder 94 houses a piston 104 fixed on an end of a piston rod 107 by a snap ring 108. The piston rod 107 extends through the piston 104 and is adapted to slideably receive the distal end of a tube 97 which is threaded at its opposite end to the cap 96. The distal end of the piston rod 97 is concentrically received in the proximal end of a tube 108 extending through the hub 92 into the chamber 100 of the gear housing 89. The distal end of the piston rod 107 is threaded to an end of a central shaft 106 extending through the tube 108. A thrust bearing 105 is positioned between the distal end of the piston rod 107 and the tube 108 to permit relative rotational movement between the two components. The thrust bearing 105 is journalled about the piston rod 107 between a circumferential shoulder formed on the external surface of the piston rod 107 and the end of the shaft 106. A centering guide 110 supports the opposite ends of the shaft 106 and tube 108 at the distal end of the apparatus 10, as best shown in FIG. 1A.

Figure 3:
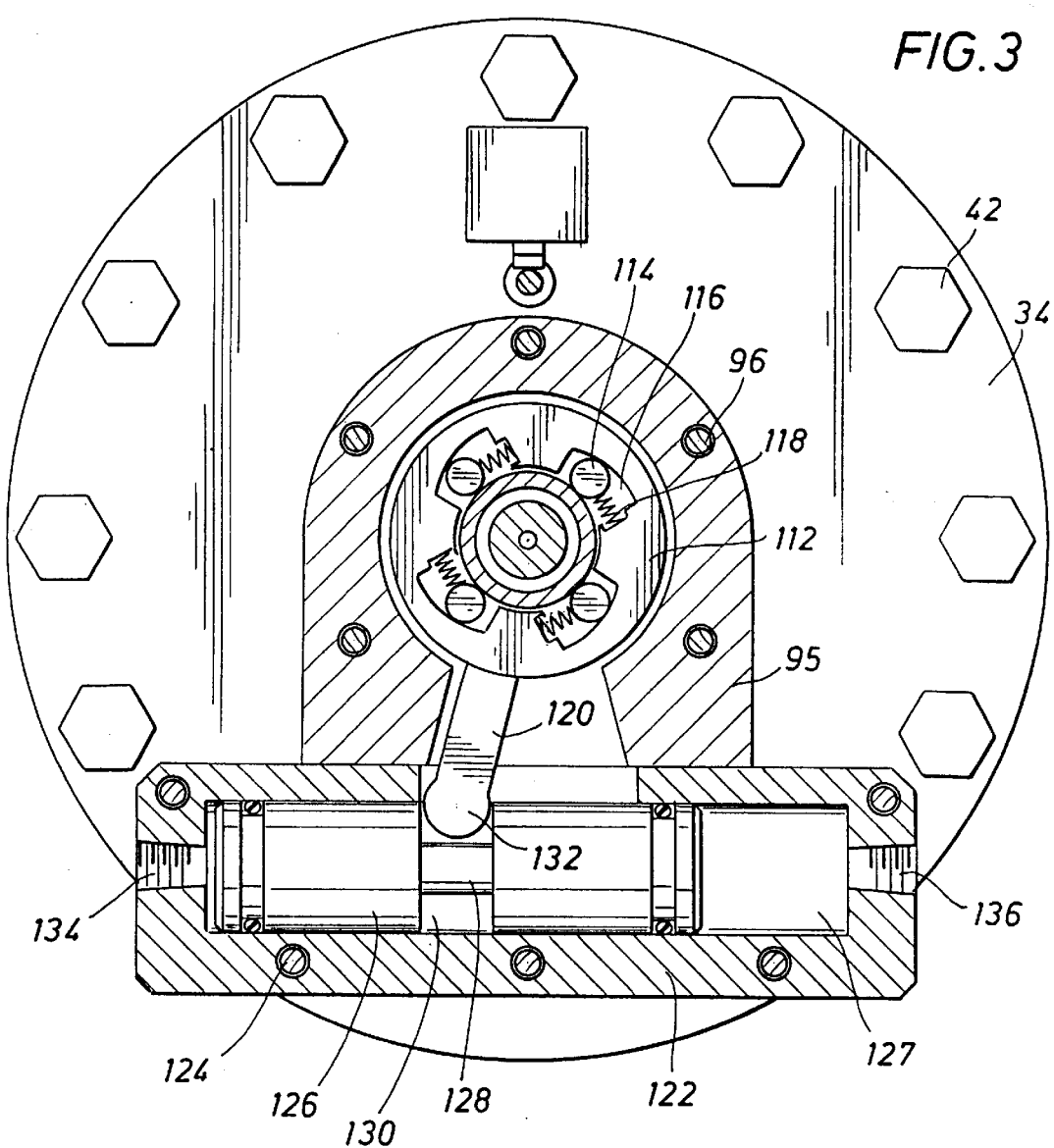
FIG. 3 is a section view taken along line 3—3 of FIG. 1C.
Figure 4:
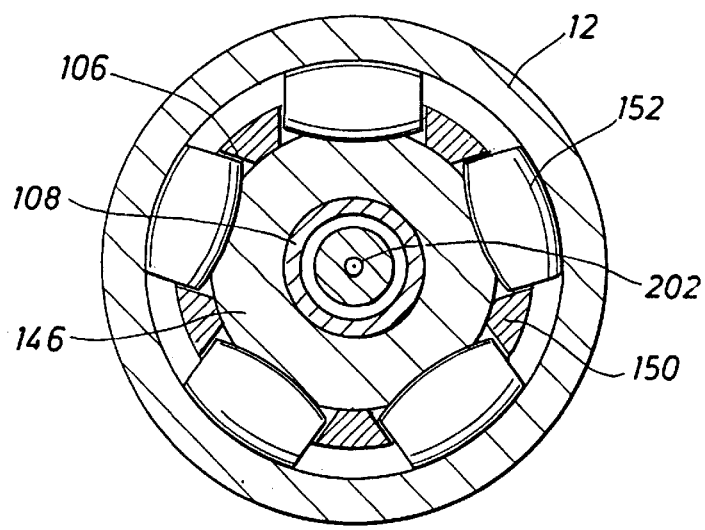
FIG. 4 is a section view taken along line 4—4 of FIG. 1B.

The proximal end of the tube 108 is received in the chamber 100 of the gear housing 89 and is in operative engagement with a ring gear 112. As best shown in FIG. 3, the ring gear 112 includes a plurality of rollers 114 received in slots 116. The slots 116 are enlarged at one end thereof. Springs 118 are provided in the enlarged area of the slots 116 for applying a force against the rollers 114 to force them toward the narrower area of the slots 116. The ring gear 112 further includes a lever arm 120 having an end thereof extending into a piston housing 122. The piston housing 122 is secured to the piston housing end plate 34 by bolts 124 and abuts against the base 90 of the gear housing 89. A piston 126 is housed within a cylindrical cavity 127 formed in the piston housing 122. The piston 126 includes a reduced diameter portion 128 defining a circumferential slot 130 in the piston 126. The lever arm 120 terminates in a rounded head 132 which extends through a window 134 in the piston housing 122 into the slot 130 of the piston 126.

Referring still to FIG. 3, hydraulic fluid is supplied to the cavity 127 through ports 134 and 136 formed in the piston housing 122. The ports 134 and 136 alternately function as an inlet or outlet port. The application of pressurized hydraulic fluid to the cavity 127 forces the piston 126 to move within the piston housing 122, first in one direction then the other. In the position shown in FIG. 3, movement of the piston 126 to the right forces the lever arm 120 to move to the right, which in turn rotates the ring gear 112 in a counter clockwise direction. Counter clockwise movement of the ring gear 112 permits the rollers 114 to move toward the enlarged area of the slots 116 without rotating the tube 108. On the return stroke of the piston 126, the lever arm 120 is forced to the left, which in turn rotates the ring gear 112 in a clockwise direction. Clockwise rotation of the ring gear 112 engages the rollers 114, which are biased toward the narrow area of the slots 116 by the springs 118, against the tube 108 and thereby causing the tube 108 to rotate.

The rotary movement of the tube 108 is imparted to the tube 46 by a longitudinal key 140 formed on the external surface of tube 108. The key 140 is received in a key hole formed in an insert 142 press fit into the threaded end 47 of the tube 46. The key 140 and insert 142 permit relative longitudinal movement between the tubes 46 and 108 while preventing relative rotational movement between the two components.

Referring again to FIGS. 1A and 1B, the tube 46 terminates in an internally threaded end 144 and is threadedly connected to a roller carriage assembly. The carriage assembly includes a shaft 146 which is in axial alignment with and threadedly connected to the tube 46. A roller cage 150 is slidably mounted about the end 148 of the shaft 146. The cage 150 carries a plurality of rollers 152 in contact with the surface of end 148 of the shaft 146. The distal end of the shaft 146 is fixed to a guide plate 154 which is journalled about the tube 108.

The roller cage 150 is slidably mounted about the end 148 of the shaft 146. A plurality of springs or elastic members 156 housed within telescoping slide tubes 158 and 160 retain the roller cage 150 about the shaft 146. The springs 156 are anchored to the tubes 158 at one end and to the tubes 160 at the opposite ends thereof. The inner tubes 158 slidably received within the outer tubes 160 are secured at one end to the roller cage 150 by pins 162. The outer tubes 160 are threadedly fixed to the centering guide 110.

Figure 2:
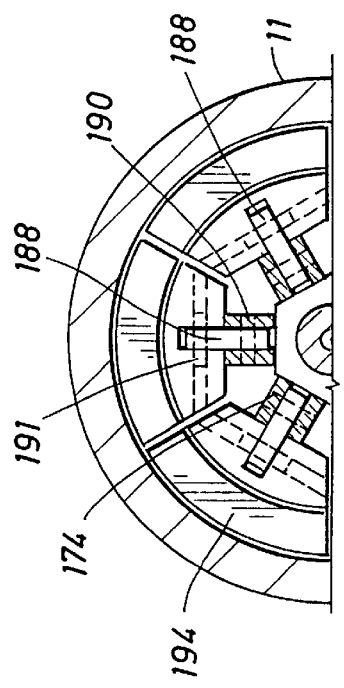
FIG. 2 is a section view taken along line 2—2 of FIG. 1A.

The rollers 152 are in contact with outwardly tapering concave surfaces 149 formed about the end 148 of the shaft 146. The surfaces 149 include a radius of curvature substantially equal to the radius of curvature of the rollers 152 as shown in FIG. 2. The surfaces 149 are equally spaced about the shaft 146 and correspond to the number of rollers 152. The surfaces 149 taper outwardly from the shoulder 151 of the shaft 146 and terminate on the periphery of the shaft 146 at point 153.

Referring now to FIG. 1A the anchor assembly of the forging apparatus 10 is shown in greater detail. The anchor assembly includes a central shaft 170 threadedly connected to the distal end of the shaft 106. The shaft 170 supports a piston housing 172 and anchor bracket 174 thereon. The shaft 172 extends through the anchor bracket 174 and terminates is a plug 178 secured to the lower end of the piston housing 172 by a snap ring 180. A piston 176 mounted about the shaft 170 is received in the piston housing 172. The piston 176 is forced toward the upper end of the piston housing 172 by a compression spring 182 positioned within the piston housing 172 between the plug 180 and the piston 176. The piston housing 172 is secured to the anchor bracket 174 by mounting bolts 184.

The anchor bracket 174 includes a base 175 having a plurality of fingers 177 circumferentially disposed on the base 175 and extending upwardly therefrom. The fingers 177 include openings 186 within which are mounted lever arms 188. The lever arms 188 are mounted to the fingers 177 by pins 190 which form a pivot axis for the lever arms 188. The opposite ends of the lever arms 188 are pivotally connected by pins 191 to mounting plates 192 which in turn support anchor shoes 194 mounted thereon. The outer faces of the shoes 194 are curved for engagement with the internal surface of the surrounding pipe 11. Each of the shoes 194 define a section of a cylinder having an outer diameter less than the internal diameter of the pipe 1, as shown in the partial section view of FIG. 2. During the forging operation, the shoes 194 are forced laterally outwardly, in a manner to be described later herein, into gripping engagement with the internal surface of the pipe 11 and thereby anchor the distal end of the forging apparatus 10 within the pipe 11.

In the following description of the operation of the forging apparatus 10, assume for purposes of illustration that a damaged pipe section in an underwater pipeline requires removal. Upon severing the pipeline and removing the damaged pipe section, the ends of the severed pipe must be connected together to repair the pipeline. Flange connectors must therefore be installed on the ends of the severed pipe so that the pipe ends may be bolted together.

Figure 5:
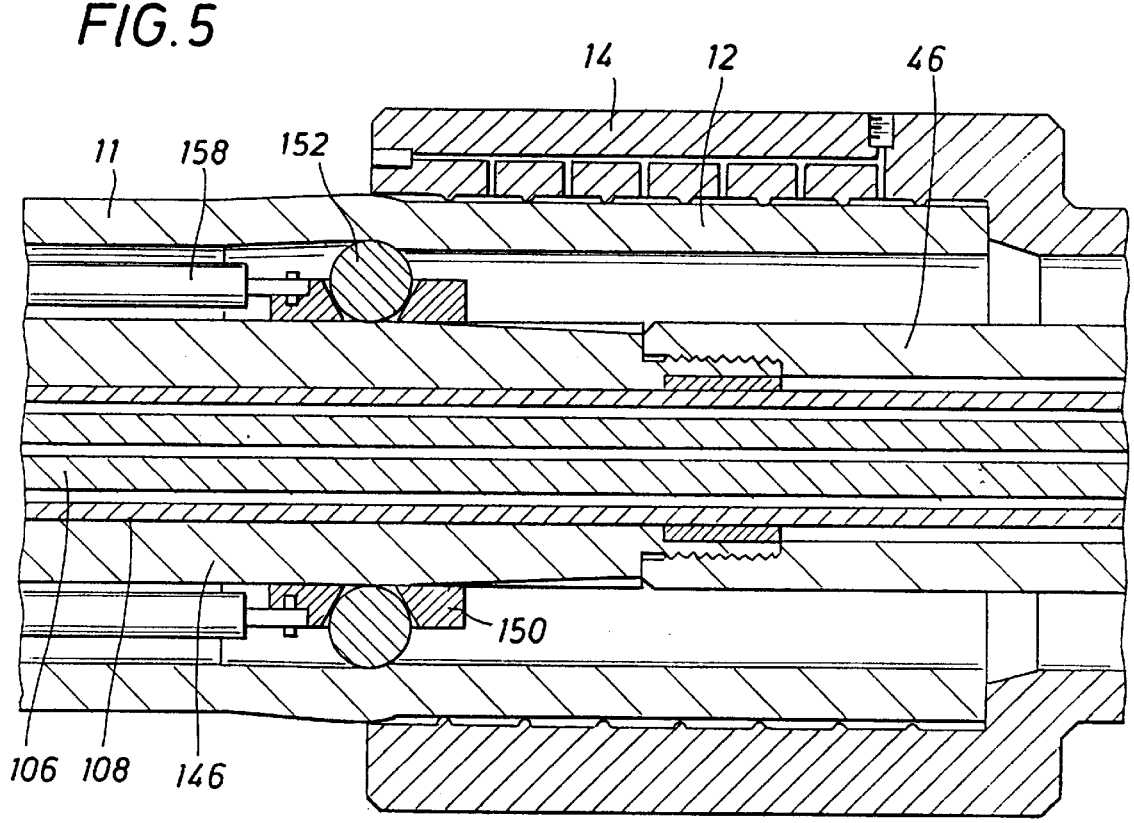
FIG. 5 is a partial section view depicting the location of the forging apparatus of the invention upon initiation of the forging sequence.

With the forging apparatus 10 of the present invention, a flange connector may be cold forged on the ends of the severed pipe. The flange connector 16 of the invention is positioned over the pipe 11 so that the collar 14 of the flange connector 16 is positioned over the end 12 of the pipe 11, with the pipe end 12 in engagement with the internal circumferential shoulder 24 of the collar 14, as illustrated in FIGS. 1A and FIG. 5. The forging apparatus 10 is then inserted through the flange connector 16 into the pipe 11 and advanced into the pipe 11 until the flange plate 18 of the flange connector 16 engages the gasket 84 fixed on the plate 32 of the forging apparatus 10 so that the distal end of the forging apparatus 10 extends into the pipe 11 as illustrated in FIG. 1A. Hydraulic pressure is then applied through port 200 into the piston chamber 102 forcing the piston 104 to the position shown in FIG. 1C. Movement of the piston 104 retracts the center shaft 106 and anchor assembly so that the anchor shoes 194 contact the guide plate 110 fixed on the center shaft 106 by snap ring 117. Engagement of the shoes 194 with the guide plate 110 applies a downward force against the tops of the shoes 194 which forces the shoes 194 to move laterally outward. Hydraulic pressure is then applied through the passage 202 extending through the center shaft 106. Hydraulic pressure is transmitted to the piston 176 through the port 204 opening into the passage 202. The hydraulic pressure acting against the piston 176, which is fixed on the center shaft 170 by snap ring 206, forces the piston housing 172 to move upwardly and compress the spring 182. Upward travel of the piston housing 172 forces the anchor bracket 174 to move in the same direction, thereby forcing the lever arms 188 to rotate about the pins 190. Pivotal movement of the lever arms 188 forces the shoes 194 laterally outwardly against the internal surface of the pipe 11. The hydraulic force applied through the passage 202 is continued as required to force the shoes 194 into locking engagement with the pipe 11 and anchor the distal end of the forging apparatus 10 within the pipe 11.

Referring now to FIG. 1C, fluid pressure is supplied through the hydraulic line 210 to the piston chamber 212. Pressurized fluid acting in the piston chamber 212 drives the piston 44 toward the flange plate 34. Piston movement is transferred through the spacer 50 and nut 52 to the tube 46 and in turn to the shaft 146 connected to the tube 46. As the shaft 146 moves in the direction of travel of the piston 44, it retracts through the roller cage 150.

As the shaft 146 is retracted through the roller cage 150, the rollers 152 which are in rolling contact with the tapered surfaces 149 move laterally outwardly into firm engagement with the internal surface of the pipe end 12 which is overlapped by the collar 14 of the flange connector 16. The application of hydraulic pressure is continued as required to force the rollers 152 outwardly sufficiently for forging the pipe end 12 into the collar 14 of the flange connector 16 as shown in FIG. 6. Circumferential ridges formed on the internal surface of the collar 14 bite into the external surface of the pipe end 12 aiding in securing the forged pipe end 12 to the collar 14. It will be appreciated however that ridges on the internal surface of the collar 14 are not necessary to effect a good connection. The collar 14 has a greater yield point than the pipe end 12, however cold forging increases the yield point of the pipe end 12 so that frictional engagement between the collar 14 and pipe end 12 will form an adequate joint.

Referring still to FIG. 1C, as the piston 44 approaches the top of its stroke, it engages the collar 74 on the rod 56 and moves the rod 56 to trip the switch 68 which switches the application of hydraulic pressure from the piston chamber 212 to the piston chamber 214 through port 216, thereby forcing the piston 44 to reverse its direction of travel. As the piston 44 approaches the bottom of its stroke, it engages the collar 72 on the rod 56 and moves the rod 56 to again trip the switch 68. At this point, the shaft 146 and roller cage 150 have returned to their initial positions. The rollers 152 retract laterally inwardly and disengage from the forged pipe end 12. Tripping the switch 68 on the return stroke of the piston 44 actuates the ring gear 112 to rotate the tube 46, shaft 146 and rollers 152 about 30° and the process is repeated to insure that the joint between the pipe end 12 and the collar 14 is adequately formed. Typically, the forging apparatus 10 makes six passes through the joint between the pipe end 12 and the collar 14 and is rotated 30° at the bottom of each stroke of the piston 44. When the joint has been forged into the configuration illustrated in FIG. 6, a connector (not shown in the drawings) secured in the threaded socket 220 formed in the collar 14 is employed to apply hydraulic fluid pressure to the conduit 222. If the joint between the pipe end 12 and the collar 14 is inadequate, the pressure of the fluid in the conduit 222 will decrease during the test period. If this occurs, the forging operation is repeated, if desired. The test is then again repeated to verify formation of a good joint. When a good joint is obtained, hydraulic pressure in the passage 202 is released, which in turn releases the fluid pressure between the piston 176 and piston housing 172. The spring 182 then forces the piston housing 172 to retract the lever arms 188 and disengage the shoes 194 from the internal surface of the pipe 11. Hydraulic pressure is then applied through the port 103 to force the piston 104 and the shaft 106 to the left, as viewed in FIG. 1C, to insure that the shoes 194 are fully disengaged from the internal surface of pipe 11. The forging apparatus 10 is then extracted from the flange connector 16. Thereafter, a second flange connector may be mated to the flange plate 18 and suitable rings, bolts and other customary components may be employed to securely connect the mating flange connectors together in a leakproof joint.

Figure 7:
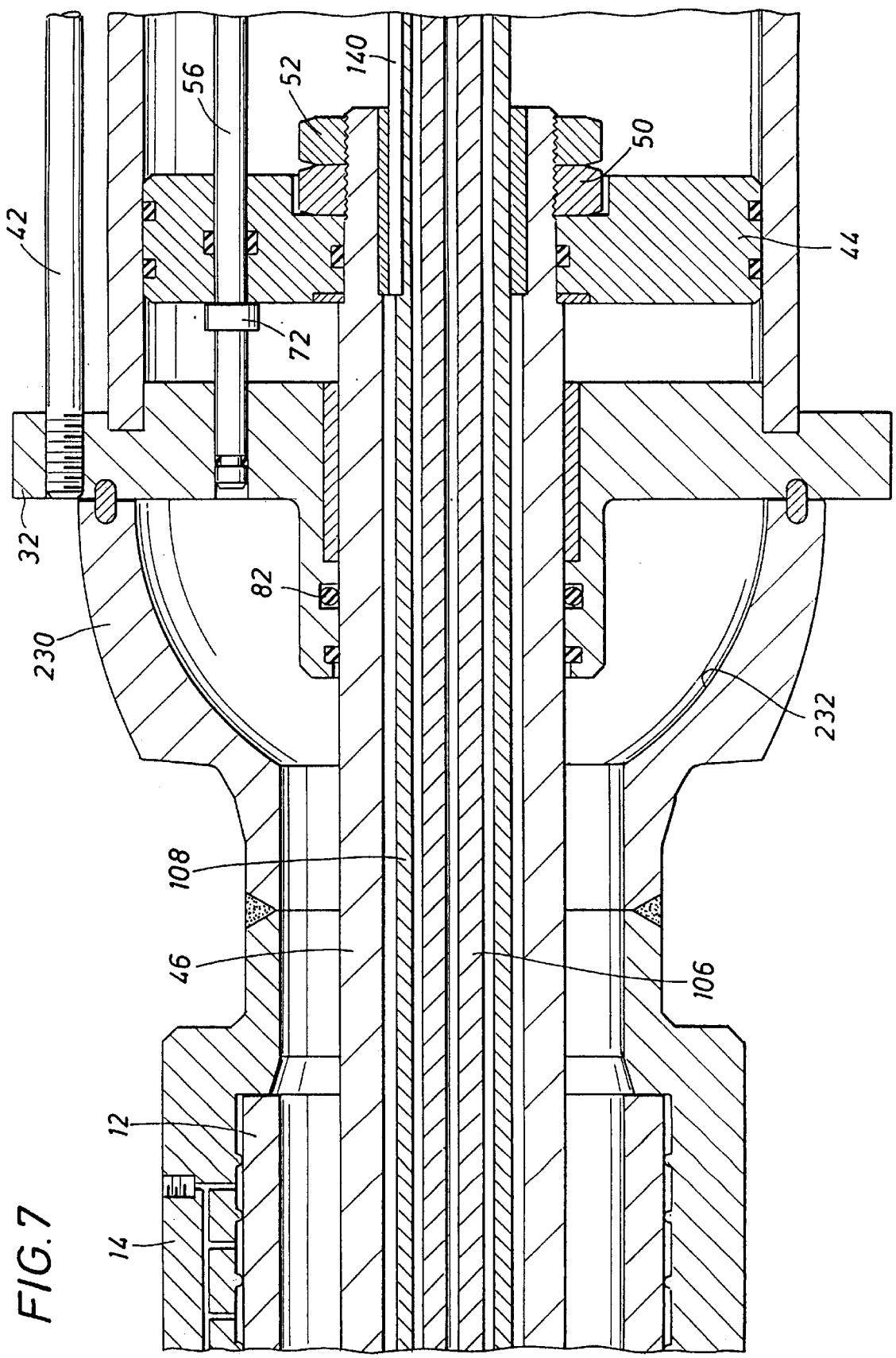
FIG. 7 is a partial section view illustrating the forging tool of the invention in use with an alternate pipe connector.
Figure 8:
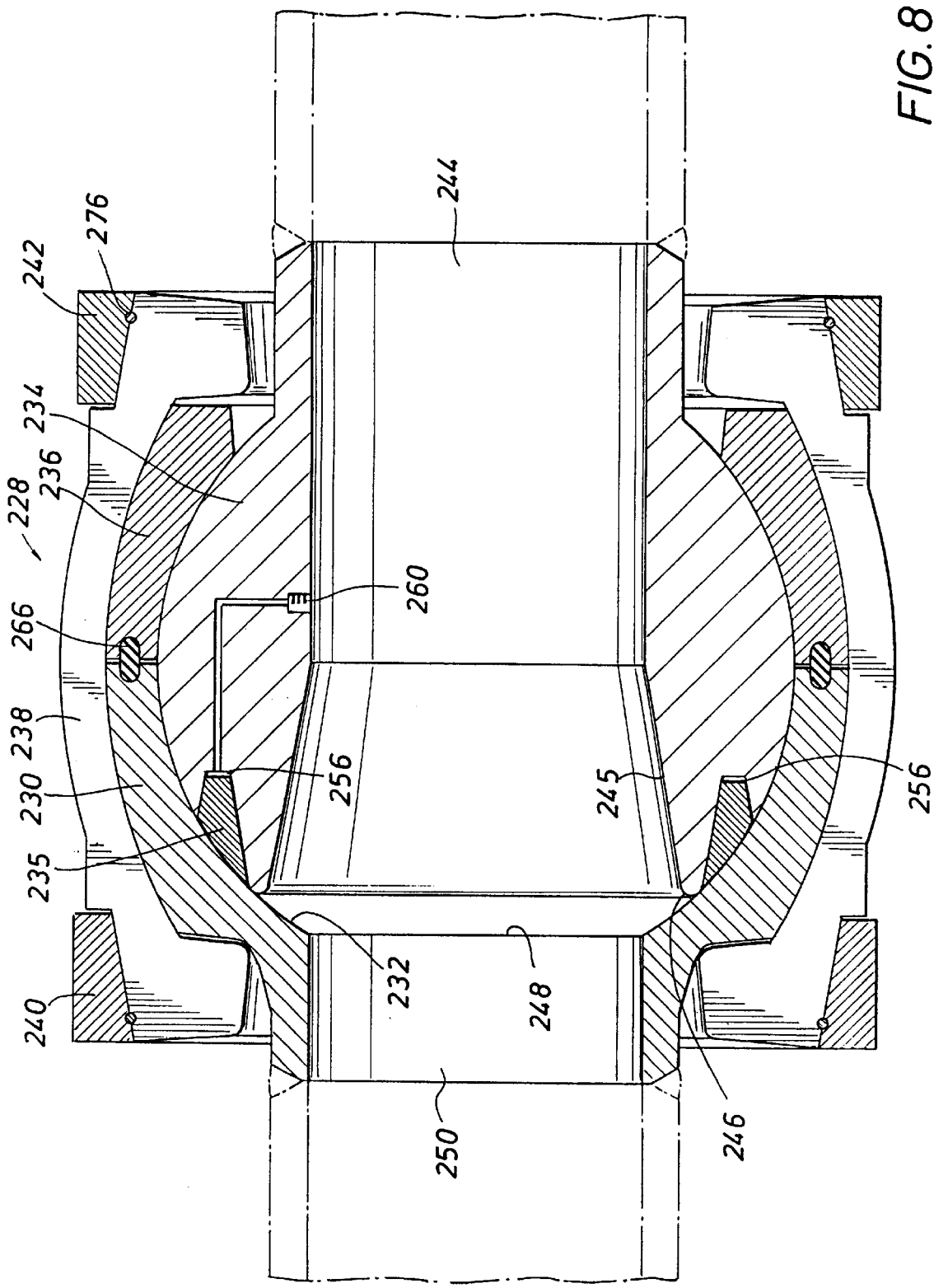
FIG. 8 is a section view of a ball and socket connector for use with the present invention.
Figure 9:
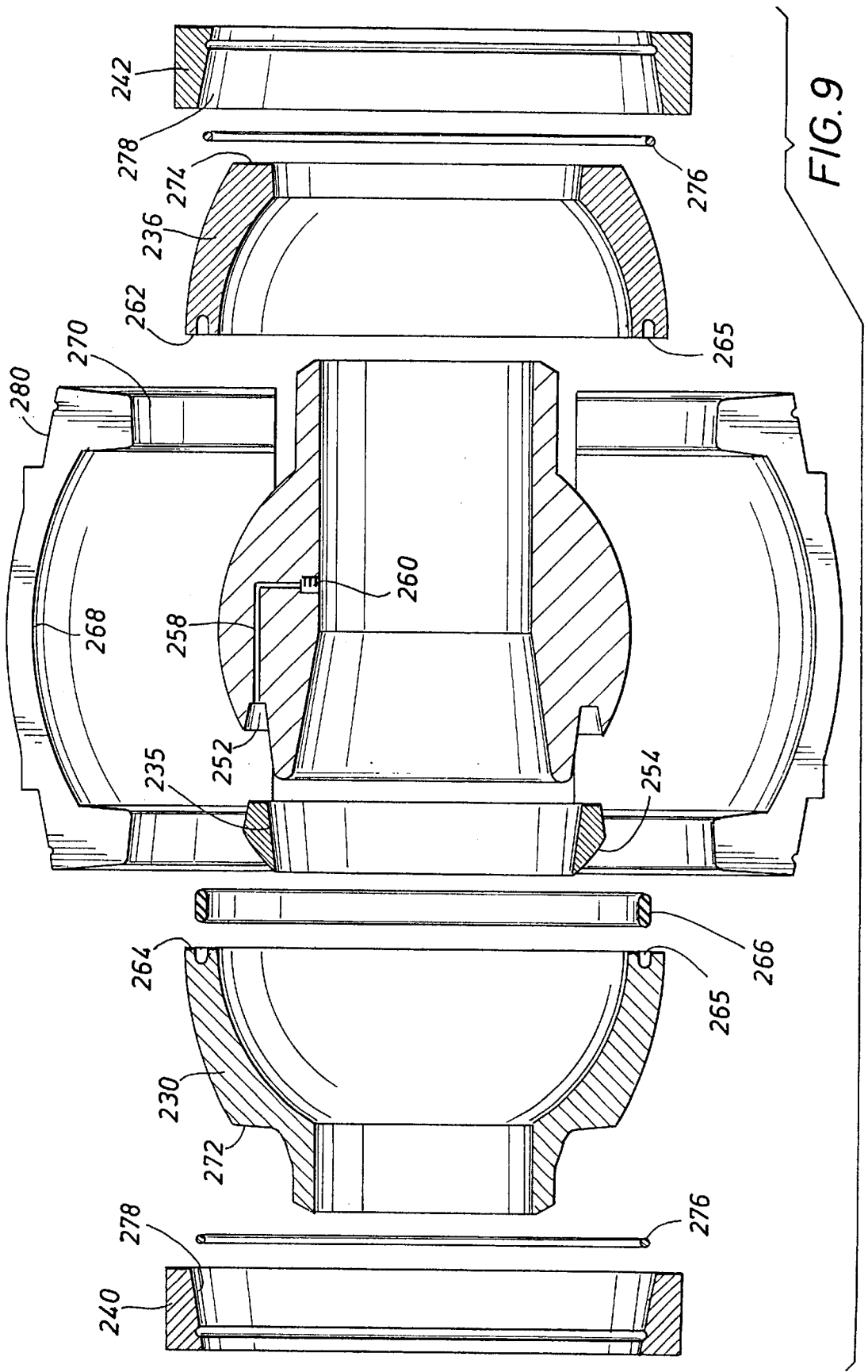
FIG. 9 is an exploded section view of the ball and socket connector of FIG. 8.

Referring now to FIGS. 7–9, a ball and socket connector assembly 228 of the invention is illustrated. The ball and socket connectors are forged to pipe ends 14 in substantially the same manner as the flange connector 16 described with respect to FIG. 1B, therefore the same reference numerals are used in FIGS. 7–9 to identify similar components. The socket connector 230 illustrated in FIG. 7 includes a an internal surface 232 defining half of a substantially spherical cavity. The socket connector 230 is adapted for mating engagement with a ball connector 234, shown in FIGS. 8 and 9, which is provided with an external surface matching the profile of the internal surface 232 of the socket connector 230.

Referring now to FIGS. 8 and 9, the connector assembly 228 includes the socket connector 230, ball connector 234, a seal ring 235, a ring 236, segmented clamp members 238 and clamp rings 240 and 242. The connector assembly 228 may accommodate misalignment between two pipes. The ball 234 may swivel relative to the socket 232. The ball 234 has a substantially spherical external surface except where it is interrupted by an axial passage 244. The passage 244 includes an internal surface 245 which tapers radially outwardly and terminates at a circumferential edge 246. It will be observed that in the assembled axial alignment of the connectors 230 and 234 shown in FIG. 8, that the leading circumferential edge 246 of the ball connector 243 is offset from the circumferential edge 248 of the axial bore 250 formed in the socket connector 230. Offset of the ball connector edge 246 in the manner shown in FIG. 8, permits the ball 234 to swivel within the cavity of the socket connector 230, but at the maximum permitted angular displacement the edge 246 does not extend beyond the edge 248 into the bore 250.

The ball and socket connector is assembled by inserting the ring seal 235 into a circumferential groove 252 formed in the ball 234. The ring seal 235 telescopes over the leading edge 246 of the ball 234 and is received in the groove 252. The seal ring 235 includes a smooth external surface 254 which has a radius of curvature less than the radius of curvature of the smooth internal surface 232 of the socket connector 230. The differences in radius of curvatures will tend to flatten the surface 254 of the seal ring 235 upon engagement with the surface 232 of the socket connector 230.

Referring again to FIG. 8, an annular cavity 256 is formed between the seal ring 235 and the circumferential groove 252. A passage 258 extending through the ball 234 provides fluid access to the cavity 256. The passage 258 is closed by threaded plug 260. The passage 258 provides fluid communication with the cavity 256 and an external pressurized fluid source for disengaging the seal ring 235 from the groove 252 in the event the connector assembly 228 is disassembled for repairs at which time the seal ring 235 will require replacement due to the flattening of the surface 254 upon engagement with the internal surface 232 of the socket connector 230.

Prior to assembling the socket and ball connectors 230 and 234, the ring collars 240 and 242 and the ring 236 are telescoped over the ball and socket connectors 230 and 234 to be subsequently assembled therewith. Upon assembly of the ball 234 with the socket 230, the ring 236 is telescoped over the external surface of the ball 234. The lead end of the ring 236 is a substantially planar circumferential surfaces 262 for facing contact with a matching planar circumferential surface 264 on the socket 230. The surface 262 and 264 are provided with opposed outwardly facing grooves 265 for receiving a gasket 266 sandwiched between the surfaces 262 and 264.

Thereafter, segmented clamp 238 is positioned about the assembled ball and socket 234 and 230. The clamp 238 preferably includes four segments, although the clamp 238 includes a lesser or greater number of segments. As will be appreciated from inspection of FIG. 8, the clamp segments 238 include a smooth internal surface 268 adapted to receive and surround the socket 230 and the ring 236. The surface 268 is bounded at each end by inwardly extending flange members 270 for mating engagement with circumferential shoulders 272 and 274 formed on the socket 230 and the ring 236, respectively. The clamp segments 238 are further provided with outwardly facing grooves formed on the external surface of the flange members 270 for partially receiving snap rings 276 therein.

Assembly of the ball and socket connector is completed by mounting the clamp rings 240 and 242 about the flange members 270. The clamp rings 240 and 242 are provided with an internal wedge surface 278 for sliding engagement with mating external wedge surfaces 280 formed on the flange members 270.

Referring now to FIG. 8, it will be observed that the slope of the interface between the wedge surfaces 278 and 280 is greater than the slope of the interface between the external surface of the ball 234 and the internal surface of the 236. The difference in slope between the respective interfaces yields a high multiplier for generating a large clamping force about the ball and socket upon securing the clamp rings 240 and 242 about the clamp segments 238.

The foregoing disclosure and description of the invention are illustrative and explanatory thereof, and various changes in the invention may be made within the scope of the appended claims without departing from the spirit of the invention. Thus, by way of example rather than limitation, while the invention has been described for underwater use, it may also be employed to advantage in connecting such conduits above water. Thus, use for surface pipeline connections or to join pipe on a surface vessel before the pipe is lowered into the water are well within the scope of the present invention. Similarly, the invention may be used to fabricate structures such as offshore production platforms and other structures which employ interconnected tubular bodies in their construction.

I claim:

1. An assembly for connecting tubular members together, comprising:
   a) first and second tubular members, each of which includes at least one end portion having an annular end face and an end opening in communication therewith, the bore of the end portion of the second tubular member being greater than the outside dimensions of the end portion of the first tubular member so that the first tubular member end portion is receivable within the second tubular member end portion to form an overlapping joint area between said first and second tubular members;
   b) means for limiting axial inward movement of the first tubular member end portion into the second tubular member end portion such that said first tubular member annular end face is completely received in the second tubular member end portion;
   c) forging means releasably mounted on the second tubular member and having a reciprocal forging head receivable within the bore of the first tubular member end portion for forging the first tubular member end portion laterally outwardly into locking engagement with the second tubular member end portion, said forging head including a plurality of rollers rotatably mounted on a roller cage supported about a support shaft, said rollers being in rolling contact with said support shaft; and
   d) an anchor assembly for releasably anchoring an end of said forging means within the first tubular member, said anchor assembly including radially moveable anchor means for locking engagement with the first tubular member.

2. The assembly of claim 1 including longitudinally extending concave surfaces circumferentially disposed on said support shaft, said concave surfaces extending from an end of said support shaft and tapering outwardly to an intermediate point on the periphery of said support shaft.

3. The assembly of claim 1 including means for reciprocating said forging head in a first direction in forging engagement with the second tubular member and in a second direction for disengaging said forging head from the second tubular member.

4. The assembly of claim 1 wherein said anchor assembly comprises a plurality of shoes for engagement with the second tubular member, said shoes being pivotally mounted on an anchor bracket connected to a central shaft extending through said forging head.

5. The assembly of claim 1 wherein said forging head includes a central shaft extending through said forging head and a longitudinally extending tube concentrically mounted about said central shaft, said longitudinally extending tube being in operative engagement with means for rotating said forging head about said central shaft.

6. An assembly for connecting tubular members together, comprising:
   a) first and second tubular members, each of which includes at least one end portion having an annular end face and an end opening in communication therewith, the bore of the end portion of the second tubular member being greater than the outside dimensions of the end portion of the first tubular member so that the first tubular member end portion is receivable within the second tubular member end portion to form an overlapping joint area between said first and second tubular members;
   b) means for limiting axial inward movement of the first tubular member end portion into the second tubular member end portion such that said first tubular member annular end face is completely received in the second tubular member end portion;
   c) forging means releasably mounted on the second tubular member and having a reciprocal forging head receivable within the bore of the first tubular member end portion for forging the first tubular member end portion laterally outwardly into locking engagement with the second tubular member end portion;
   d) means for reciprocating said forging head in a first direction in forging engagement with the first tubular member and in a second direction for disengaging said forging head from the first tubular member; and
   e) an anchor assembly for releasably anchoring an end of said forging means within the first tubular member, said anchor assembly including radially moveable anchor means for locking engagement with the first tubular member.

7. The assembly of claim 6 wherein said forging head includes a plurality of rollers rotatably mounted on a roller cage supported about a support shaft, said rollers being in rolling contact with said support shaft.

8. The assembly of claim 7 including biasing means for retaining said rollers in contact with said support shaft, said biasing means housed within telescoping tubes radially spaced from and parallel to said support shaft for maintaining said roller cage under tension.

9. An assembly for connecting tubular members together, comprising:
   a) first and second tubular members, each of which includes at least one end portion having an annular end face and an end opening in communication therewith, the bore of the end portion of the second tubular member being greater than the outside dimensions of the end portion of the first tubular member so that the first tubular member end portion is receivable within the second tubular member end portion to form an overlapping joint area between said first and second tubular members;
   b) means for limiting axial inward movement of the first tubular member end portion into the second tubular member end portion such that said first tubular member annular end face is completely received in the second tubular member end portion;
   c) forging means releasably mounted on the second tubular member and having a reciprocal forging head receivable within the bore of the first tubular member end portion for forging the first tubular member end portion laterally outwardly into locking engagement with the second tubular member end portion;
   d) said forging head including a central shaft extending through said forging head and a longitudinally extending tube concentrically mounted about said central shaft, said longitudinally extending tube being in operative engagement with means for rotating said forging head about said central shaft; and e) an anchor assembly for releasably anchoring an end of said forging means within the first tubular member, said anchor assembly including radially moveable anchor means for locking engagement with the first tubular member.

10. The assembly of claim 9 including means for alternately reciprocating and rotating said forging head about said central shaft.

11. An assembly for connecting tubular members together, comprising:

a) first and second tubular members, each of which includes at least one end portion having an annular end face and an end opening in communication therewith, the bore of the end portion of the second tubular member being greater than the outside dimensions of the end portion of the first tubular member so that the first tubular member end portion is receivable within the second tubular member end portion to form an overlapping joint area between said first and second tubular members;

b) means for limiting axial inward movement of the first tubular member end portion into the second tubular member end portion such that said first tubular member annular end face is completely received in the second tubular member end portion;

c) forging means releasably mounted on the second tubular member and having a reciprocal forging head receivable within the bore of the first tubular member end portion for forging the first tubular member end portion laterally outwardly into locking engagement with the second tubular member end portion; and d) an anchor assembly for releasably anchoring an end of said forging means within the first tubular member, said anchor assembly including a plurality of shoes for engagement with the second tubular member, said shoes being pivotally mounted on an anchor bracket connected to a central shaft extending through said forging head.

* * * * *